US009481209B2

(12) United States Patent
Becker et al.

(10) Patent No.: US 9,481,209 B2
(45) Date of Patent: Nov. 1, 2016

(54) PNEUMATIC VEHICLE TIRE

(71) Applicant: Continental Reifen Deutschland GmbH, Hannover (DE)

(72) Inventors: Theresia Becker, Duesseldorf (DE); Thomas Glasewald, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 288 days.

(21) Appl. No.: 13/873,087

(22) Filed: Apr. 29, 2013

(65) Prior Publication Data

US 2013/0248073 A1 Sep. 26, 2013

Related U.S. Application Data

(63) Continuation of application No. PCT/EP2011/064346, filed on Aug. 22, 2011.

(30) Foreign Application Priority Data

Oct. 29, 2010 (DE) .................. 10 2010 060 257

(51) Int. Cl.
*B60C 9/18* (2006.01)
*B60C 9/20* (2006.01)
*B60C 9/22* (2006.01)

(52) U.S. Cl.
CPC ............... *B60C 9/18* (2013.01); *B60C 9/2006* (2013.04); *B60C 2200/06* (2013.04)

(58) Field of Classification Search
CPC ......... B60C 9/18; B60C 9/20; B60C 9/2003; B60C 9/2006; B60C 9/2009; B60C 9/22; B60C 9/2004; B60C 9/28
See application file for complete search history.

(56) References Cited

U.S. PATENT DOCUMENTS

| | | | | |
|---|---|---|---|---|
| 4,564,055 A | * | 1/1986 | Ghilardi | 152/450 |
| 5,027,877 A | | 7/1991 | Tamura et al. | |
| 5,111,864 A | * | 5/1992 | Nakano | B60C 9/2006 152/526 |
| 5,285,623 A | * | 2/1994 | Baillievier et al. | 57/236 |
| 5,637,163 A | * | 6/1997 | Kobayashi | B60C 9/20 152/526 |
| 5,661,966 A | * | 9/1997 | Matsumaru | 57/237 |
| 6,315,019 B1 | * | 11/2001 | Garlaschelli | B60C 9/18 152/526 |
| 6,367,527 B1 | * | 4/2002 | Cluzel | 152/527 |
| 6,401,778 B1 | * | 6/2002 | Cluzel | 152/526 |
| 8,096,335 B2 | * | 1/2012 | Bondu | 152/535 |

FOREIGN PATENT DOCUMENTS

WO WO 2008/068133 * 6/2008

OTHER PUBLICATIONS

International Search Report dated Sep. 22, 2011 of international application PCT/EP2011/064346 on which this application is based.

* cited by examiner

*Primary Examiner* — Justin Fischer
(74) *Attorney, Agent, or Firm* — Walter Ottesen, P.A.

(57) ABSTRACT

A pneumatic vehicle tire includes a carcass, a tire belt configured radially outside of the carcass and a profiled tread. The tire belt is formed of a plurality of tire belt plies, of which at least two tire belt plies are configured as working plies having parallel reinforcements made of steel and embedded in rubber, and having an angle of 10° to 24° with respect to the circumferential direction (U). The reinforcements of the one working ply have an axial direction of inclination opposite with respect to the reinforcements of the other working ply. The reinforcements of the first of the two working plies have an extendability D of D<0.2% at 10% of the breaking force, and the reinforcements of the second of the two working plies have an extendability D of D>0.2% at 10% of the breaking force.

13 Claims, 6 Drawing Sheets

PNEUMATIC VEHICLE TIRE

CROSS REFERENCE TO RELATED APPLICATIONS

This application is a continuation application of international patent application PCT/EP2011/064346, filed Aug. 22, 2011, designating the United States and claiming priority from German application 10 2010 060 257.4, filed Oct. 29, 2010, and the entire content of both applications is incorporated herein by reference.

FIELD OF THE INVENTION

The invention relates to a pneumatic vehicle tire for utility vehicles having a carcass, a tire belt configured radially outside the carcass and a profiled tread which is constructed on the tire belt, radially outside the tire belt. The tire belt is formed from a plurality of tire belt plies arranged resting one on top of the other from radially on the inside to radially on the outside, at least two of which tire belt plies are embodied as working plies. The radially inner working ply and the radially outer working ply of the two working plies are tire belt plies which include parallel reinforcement or strengthening members which are made of steel and are embedded in rubber. The reinforcement members of the radially inner working ply enclose in their orientation an angle $\alpha$ with the circumferential direction U where $10° \leq \alpha \leq 24°$. The reinforcement members of the radially outer working ply enclose an angle $\gamma$ with the circumferential direction U where $10° \leq \gamma \leq 24°$. Viewed in the circumferential direction U of the vehicle tire the reinforcement members of the one working ply have an opposing axial direction of inclination to that of the reinforcement members of the other working ply.

BACKGROUND OF THE INVENTION

Pneumatic vehicle tires for utility vehicles are known in which the tire belt is formed from four tire belt plies which are arranged one on top of the other in the radial direction, two tire belt plies of which are embodied as working plies whose reinforcement members are each oriented in their profile enclosing an angle of 15° to 24° with the circumferential direction of the vehicle tire. The reinforcement members of the one working ply have here an opposing axial direction of inclination with respect to the reinforcement members of the other working ply. The two working plies as a result form a cross bracing assembly. The tire belt also usually has, beneath the working plies, a tire belt ply which is embodied as a blocking ply and whose reinforcement members enclose in their profile an angle of 45° to 70° with the circumferential direction. Furthermore, an additional protective ply is usually formed as a fourth ply radially above the two working plies, the reinforcement members of which additional protective ply enclose in their profile an angle of 15° to 24° with the circumferential direction. The reinforcement members of these tire belt plies are steel cords.

The working plies of the known pneumatic vehicle tires for utility vehicles are formed here from reinforcement members with substantially identical extendibility. If the reinforcement members of the two working plies are of substantially nonextendible design, this provides a high degree of circumferential strength of the tire belt, which has a positive effect on the wear of the tire. However, with such a design, the resistance of the tire belt against the intrusion of stones into the tire belt when rolling over uneven surfaces is restricted, which favors penetration of the tire belt unless there are additional measures which counteract the intrusion. In addition, it is known to form the two working plies of such a tire belt with extendible reinforcement members in the tire, as a result of which a high degree of resistance against the intrusion of stones into the tire belt is made possible, but this is at the price of accepting low circumferential strength. This can have an adverse effect on the wear properties of the tire.

SUMMARY OF THE INVENTION

It is an object of the invention to provide in a simple manner a pneumatic vehicle tire for utility vehicles, which tire permits a high degree of circumferential strength of the tire belt accompanied by a high degree of resistance to the intrusion of stones through the tire belt.

The object is achieved according to the invention by an embodiment of a pneumatic vehicle tire for utility vehicles, which includes a carcass, a tire belt configured radially outside the carcass and a profiled tread which is constructed on the tire belt, radially outside the tire belt. The tire belt is formed from a plurality of tire belt plies arranged resting one on top of the other from radially on the inside to radially on the outside, at least two of which tire belt plies are embodied as working plies. The radially inner working ply and the radially outer working ply of the two working plies are tire belt plies which include parallel reinforcement members which are made of steel and are embedded in rubber. The reinforcement members of the radially inner working ply enclose in their orientation an angle $\alpha$ with the circumferential direction U where $10° \leq \alpha \leq 24°$, and the reinforcement members of the radially outer working ply enclose an angle $\gamma$ with the circumferential direction U where $10° \leq \gamma \leq 24°$. Viewed in the circumferential direction U of the vehicle tire the reinforcement members of the one working ply have an opposing axial direction of inclination to that of the reinforcement members of the other working ply, according to the features of an embodiment, in which the reinforcement members of the first of the two working plies in the tire are of nonextendible design with an extendability D of D<0.2% at 10% of the breaking force, and the reinforcement members of the second of the two working plies in the tire are of extendible design with an extendability D of D≥0.2% at 10% of the breaking force.

As a result of the embodiment of the one working ply with nonextendible reinforcement members, a high degree of circumferential strength is made possible, and at the same time as a result of the embodiment of the other working ply with extendible reinforcement members, an increased degree of resistance to the intrusion of stones when rolling over uneven surfaces is made possible. This, in a simple manner, makes possible the pneumatic vehicle tire for utility vehicles with good wear properties accompanied by good resistance to the intrusion of stones into the tire belt. The cross bracing assembly and the function of the working plies remain unaffected.

An embodiment of a pneumatic vehicle tire in which the reinforcement members of the second working ply each have a breaking force F where F>2500N is particularly advantageous. The risk, which occurs when rolling over stones, of the reinforcement members breaking owing to the tensile forces which act can be reliably minimized as a result.

An embodiment of a pneumatic vehicle tire in which the reinforcement members of the first working ply each have a breaking force F where F≤2500N is preferred.

An embodiment of a pneumatic vehicle tire in which the first of the two working plies in the tire is arranged in a position radially inside the second of the two working plies is advantageous. As a result, that working ply which has particularly high resistance to the intrusion of stones is the working ply which is located closer to the road during the rolling. The protection of the tire against the intrusion of stones can be improved further by this.

An embodiment of a pneumatic vehicle tire, in which a tire belt ply which is embodied as a zero degree ply is arranged between the two working plies, which tire belt ply includes parallel reinforcement members which are embedded in rubber and which enclose in their orientation an angle β where 0°≤β≤5° with the circumferential direction U, is particularly advantageous. As a result of this embodiment, the circumferential strength of the tire belt can be increased, which positively influences the durability, and the wear rate can be reduced.

An embodiment of a pneumatic vehicle tire in which the reinforcement members of the second working ply each have an extension D of 0.2%≤D≤0.35% at 10% of the breaking force is particularly advantageous. As a result, an optimum balance can be made possible between the circumferential strength and the resistance to stones.

An embodiment of a pneumatic vehicle tire in which a further tire belt ply having parallel reinforcement members which are embedded in rubber is formed radially outside the radially outer working ply on the outer working ply is particularly advantageous. As a result, the protection against the intrusion of stones can be improved further.

An embodiment of a pneumatic vehicle tire in which the further tire belt ply is embodied as a zero degree ply whose reinforcement members enclose in their orientation an angle δ with the circumferential direction U of the pneumatic vehicle tire where 0°≤δ≤5° is particularly advantageous. As a result, the circumferential strength can be increased further and the wear improved further.

An embodiment of a pneumatic vehicle tire in which the reinforcement members of the additional tire belt ply enclose in their orientation an angle δ with the circumferential direction U of the pneumatic vehicle tire where 10°≤δ≤90°, in particular where 15°≤δ≤45°, is particularly advantageous for achieving an optimum wear pattern.

Particularly advantageous is an embodiment of a pneumatic vehicle tire in which a further tire belt ply having parallel reinforcement members, which are embedded in rubber and whose reinforcement members enclose in their orientation an angle ε with the circumferential direction U of the pneumatic vehicle tire, in particular where 45°≤ε≤90°, is formed radially inside the radially inner working ply between the carcass and the radially inner working ply. As a result, the movement of the working plies can be reduced further and the durability can be improved further.

An embodiment of a pneumatic vehicle tire in which the zero degree ply which is arranged radially between the two working plies is made smaller in its axial extent (b) in the pneumatic vehicle tire, in particular at least 10 mm smaller, than each of the two working plies is particularly advantageous. The zero degree ply is as a result highly limited in its movement in the tire belt and is as a result even better protected against breakage of its reinforcement members.

An embodiment of a pneumatic vehicle tire in which the zero degree ply ends inside the axial extent region of each of the two working plies toward both axial sides is particularly advantageous. The zero degree ply is as a result highly limited in its movement in the tire belt and is as a result even better protected against breakage of its reinforcement members.

An embodiment of a pneumatic vehicle tire wherein the radially outer working ply of the two working plies is made smaller in its axial extent (c) in the pneumatic vehicle tire than the radially inner working ply of the two working plies, is particularly advantageous. Shearing between the working plies can as a result be additionally reduced and the durability improved. Furthermore, this can permit improved distribution of strength and as a result an improved wear pattern.

An embodiment in which the radially outer working ply of the two working plies ends inside the axial extent region of the radially inner working ply of the two working plies toward both axial sides is particularly advantageous. This permits the shearing between the working plies to additionally reduced further and the durability to be improved. Furthermore, this can permit further improved distribution of strength and as a result an improved wear pattern.

An embodiment of a pneumatic vehicle tire in which the reinforcement members of the zero degree ply/plies are reinforcement members made of steel is particularly advantageous. The effect of the zero degree ply/plies can as a result be improved further and the circumferential strength increased. This permits the wear and the durability to be improved further.

An embodiment of a pneumatic vehicle tire in which the reinforcement members of at least the zero degree ply arranged between the working plies are high elongation (HE) cords is particularly advantageous. As a result, lifting of the tire in the building process of the tire can be easily made possible.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
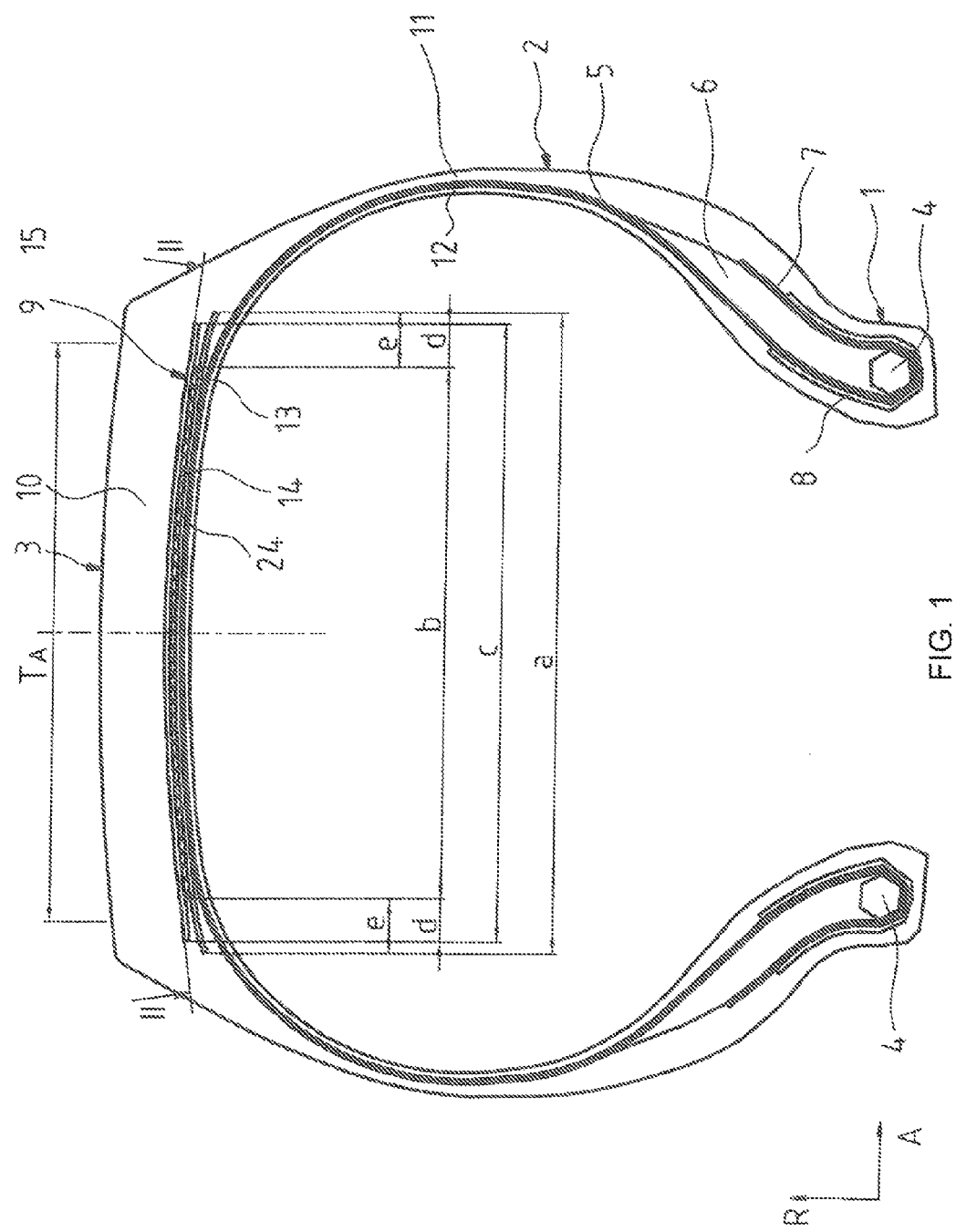
FIG. 1 shows a cross sectional view of a pneumatic vehicle tire for utility vehicles of radial design.
Figure 2:
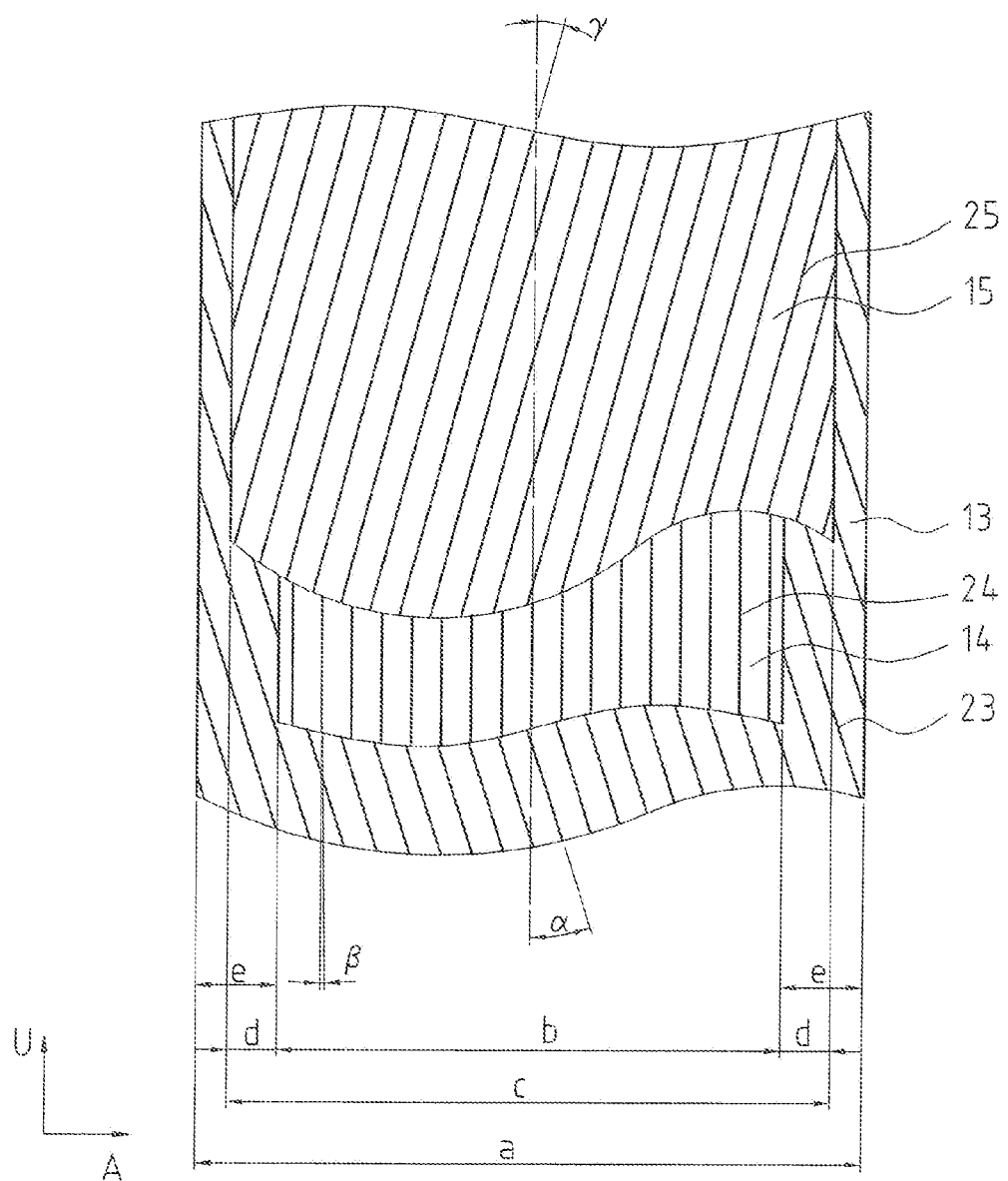
FIG. 2 shows a plan view of the tire belt of FIG. 1 according to section II-II from FIG. 1, in which for the sake of simplification all the other components of the tire are not shown.

FIGS. 1 and 2 show a pneumatic utility vehicle tire of radial design having two side walls 2 extending in the radial direction R of the vehicle tire and a crown region 3 which is formed axially therebetween. The side walls are each embodied with a bead region 1 at their extent end pointing inward in the radial direction, in which bead region 1 a bead core 4 extends in the circumferential direction U in a tension-resistant fashion over the circumference of the tire in the circumferential direction. The bead cores 4 are formed wound from wire which extends in the circumferential direction U of the pneumatic vehicle tire and is embedded in rubber. An apex 6 made of hard rubber material with a triangular cross section is formed in a conventional way on the bead cores 4.

The pneumatic vehicle tire is embodied with a carcass 5 which extends in the radial direction R of the pneumatic vehicle tire from the bead core 4 formed in the left hand bead region 1 of the pneumatic vehicle tire, outward through the left hand side wall 2 to the crown region 3 and in the axial direction A of the pneumatic vehicle tire in the crown region 3 to the right hand side wall 2, and radially inward in the right hand side wall 2 of the pneumatic vehicle tire to the bead core 4 which is formed in the bead region 1 of the right hand side wall 2. In both bead regions 1, the carcass is formed extending radially outward as a turned-over part 7 in each case along the axial inner side of the bead core 4 to the radial inner side of the respective bead core 4, and then as a prolongation in the axial direction along the radial inner side of the bead core 4 to the axial outer side of the bead core 4 and then as a prolongation on the axial outer side of the bead core 4. The carcass 5 extends with its turned over part 7 along the axial outer side of the apex 6 and ends on the axial outer side of the apex 6.

The carcass is formed from a carcass ply which extends in the circumferential direction U over the entire circumference of the pneumatic vehicle tire and comprises parallel cords, for example steel cords, which are embedded in rubber and which extend substantially in the radial direction R in the region of the side walls 2 and substantially in the axial direction A in the crown region. An inner ply 12 made of known rubber material which is particularly impermeable to air extends on the side of the carcass 5 pointing to the inside of the tire from the left-hand bead region 1 to the right-hand bead region 1. In each case an additional bead reinforcing strip 8, which extends over the entire circumference of the pneumatic vehicle tire, is formed in the bead region 1, on the side of the carcass 5 pointing away from the bead core 4. The bead reinforcing strip 8 is, for example, a material strip which is formed from parallel reinforcement members of textile or metallic design and is embedded in rubber.

A tire belt 9 which extends over the entire circumference of the pneumatic vehicle tire in the circumferential direction U and in the axial direction A from the left hand tire shoulder to the right hand tire shoulder is formed on the carcass 5, in the region of the tire crown 3 in the radial direction R of the pneumatic vehicle tire outside the carcass 5, which tire belt 9 is formed from three tire belt plies 13, 14 and 15 which are arranged one above the other in the radial direction R and resting one on the other. A profiled tread 10 which extends in the axial direction A from the left hand tire shoulder to the right hand tire shoulder, extends over the entire circumference of the pneumatic vehicle tire in the circumferential direction U and, which completely covers the tire belt 9, is formed radially outside the tire belt 9 on the tire belt 9. A side wall rubber strip 11, which extends in the radial direction R from the bead region 1 to the profiled tread 10 in the crown region 3 is formed in the region of the tire side walls 2 on the side of the carcass 5 pointing axially away from the tire.

The radially inner tire belt ply 13 and the radially outer tire belt ply 15 are embodied as working plies of the tire and each extend in the circumferential direction U over the entire circumference of the pneumatic vehicle tire and in the axial direction A from the left hand tire shoulder to the right hand tire shoulder. The working ply 13 is formed from a ply of thread shaped parallel reinforcement members 23 which are embedded in rubber and which extend substantially linearly over the entire width (a) of the tire belt ply 13 measured in the axial direction A and enclose an angle $\alpha$ of inclination with the circumferential direction U where $10°\leq\alpha\leq24°$. The working ply 15 is formed from a ply of thread shaped parallel reinforcement members 25 which are embedded in rubber and which extend substantially linearly over the entire axial width (c) of the tire belt ply 15 and enclose an angle $\gamma$ of inclination with the circumferential direction U where $10°\leq\gamma\leq24°$. The direction of inclination of the reinforcement members 25 of the working plies 15 viewed in the circumferential direction U is formed in the opposing axial direction A to the direction of inclination of the reinforcement members 23 of the working ply 13.

The third tire belt ply 14 which is formed between the two working plies 15 and 13 extends in the circumferential direction U over the entire circumference of the pneumatic vehicle tire and in the axial direction from the left hand tire shoulder to the right hand tire shoulder and is embodied as a 0° ply. For this purpose, the tire belt ply 14 is formed from parallel thread shaped reinforcement members which are embedded in rubber and which extend linearly over the entire circumference of the pneumatic vehicle tire enclosing an angle $\beta$ where $0°\leq\beta\leq5°$ with the circumferential direction U and are therefore oriented substantially in the circumferential direction U of the pneumatic vehicle tire. All three tire belt plies 13, 14 and 15 each extend on both axial sides into a position in the respective tire shoulder which lies axially outside the latch area represented by the axial width $T_a$ of the latch area. Over its entire axial extent, the tire belt ply 14 is in direct contact both with the working ply 13 arranged under it and with the working ply 15 arranged over it.

The 0° ply 14 extends in the axial direction A over an axial width (b), the lower working ply 13 extends in the axial direction A over an axial width (a), and the upper working ply 15 extends in the axial direction A over an axial width (c) in the tire where a>c>b. In this context, the inner working ply 13 extends on both axial sides of the 0° ply 14 by an axial extent length (e) beyond the axial position of the respective tire belt edge of the 0° ply 14. Likewise, the outer working ply 15 extends in both axial directions, in each case by an axial extent length (d) beyond the axial position of the respective tire belt edge of the 0° ply 14. The following applies for the extent lengths (e) and (d) of this protruding portion: e>d. The dimension (d) is formed here with d≥10 mm. The dimension (e) is formed in the exemplary embodiment with e≤60 mm. In the region of the protruding portion, the two working plies 13 and 15 do not touch either.

The reinforcement members 25 of the working plies 15 are steel cords which, when subjected to tensile stress, have a breaking force F where F≤2500N and which, given 10% of the breaking force, have an extension D of D<0.2%, measured in the tire. Such steel cords are, for example, steel cords of the type 3×0.20+6×0.35 with a breaking force F=1700N and with an extendability D of D=0.1% at 10% of the breaking force.

The reinforcement members 23 of the working plies 13 are steel cords which, when subjected to tensile stress, have a breaking force F of F>2500N and which, given 10% of the breaking force, have an extendability D of D≥0.2%, measured in the tire. Such steel cords are, for example, steel cords of the type 3+8×0.35 HT with a breaking force F=3100N and with an extension D of D=0.23% at 10% of the breaking force.

The values are determined with the BISFA E6 standard test method for steel cords.

In one design, the reinforcement members 24 are steel cords. In another design, the reinforcement members 24 are steel cords which are embodied as high elongation cord (HE cord). Such highly extendible high elongation cords have a modulus of elasticity given an extension between 0% and 2% which is smaller than their modulus of elasticity given an extension by more than 2%.

In one exemplary embodiment, the following are selected: $\beta=1°$, $\alpha=20°$, $\gamma=20°$, d=11 mm and e=15 mm.

In an alternative embodiment to the abovementioned designs, in each case the angle $\alpha$ of inclination of the reinforcement members 23 of the inner working ply 13 is made larger than the angle $\gamma$ of inclination of the reinforcement members 25 of the outer working ply 15.

In an alternative design to the abovementioned designs, in each case the angle $\alpha$ of inclination of the reinforcement members 23 of the inner working ply 13 is made smaller than the angle $\gamma$ of inclination of the reinforcement members 25 of the outer working ply 15.

Figure 3:
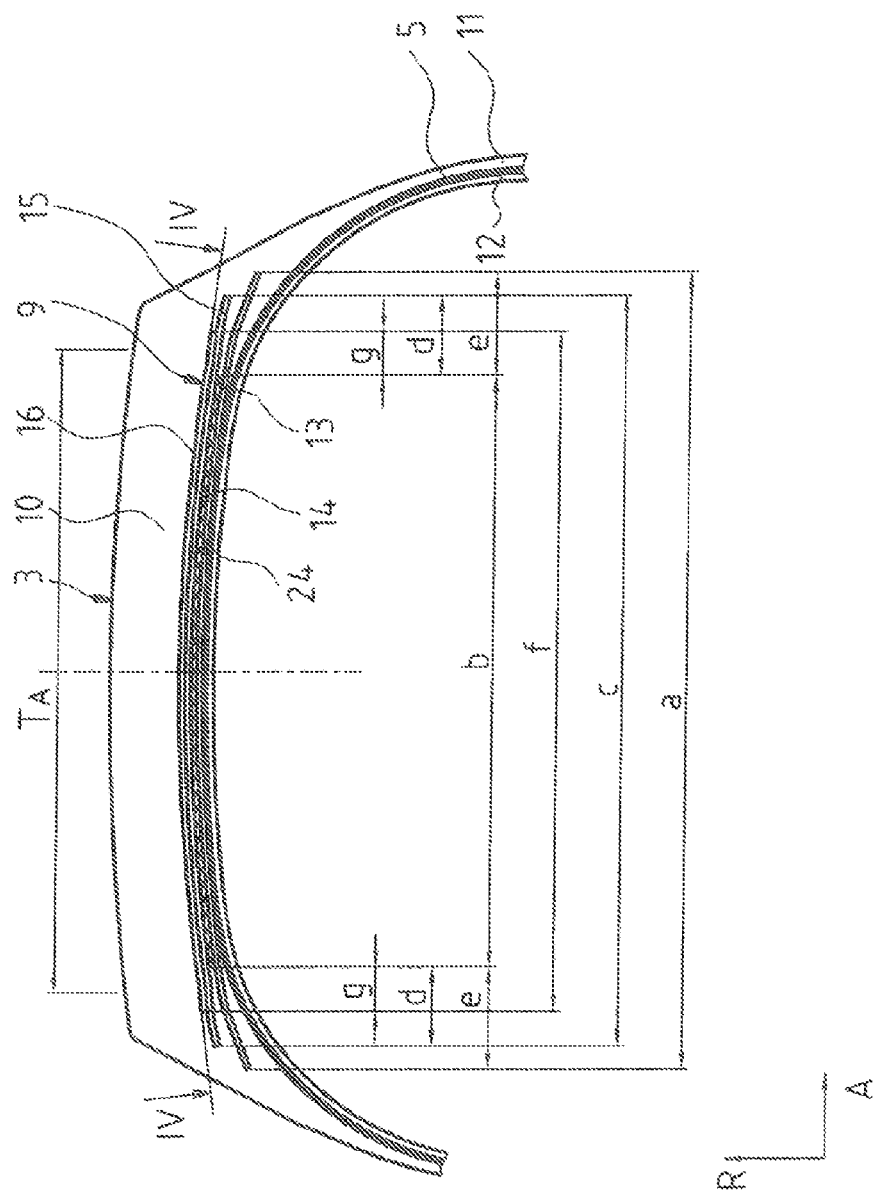
FIG. 3 shows a partial cross-sectional view of a pneumatic vehicle tire similar to the view in FIG. 1 with an alternative tire belt embodiment.
Figure 4:
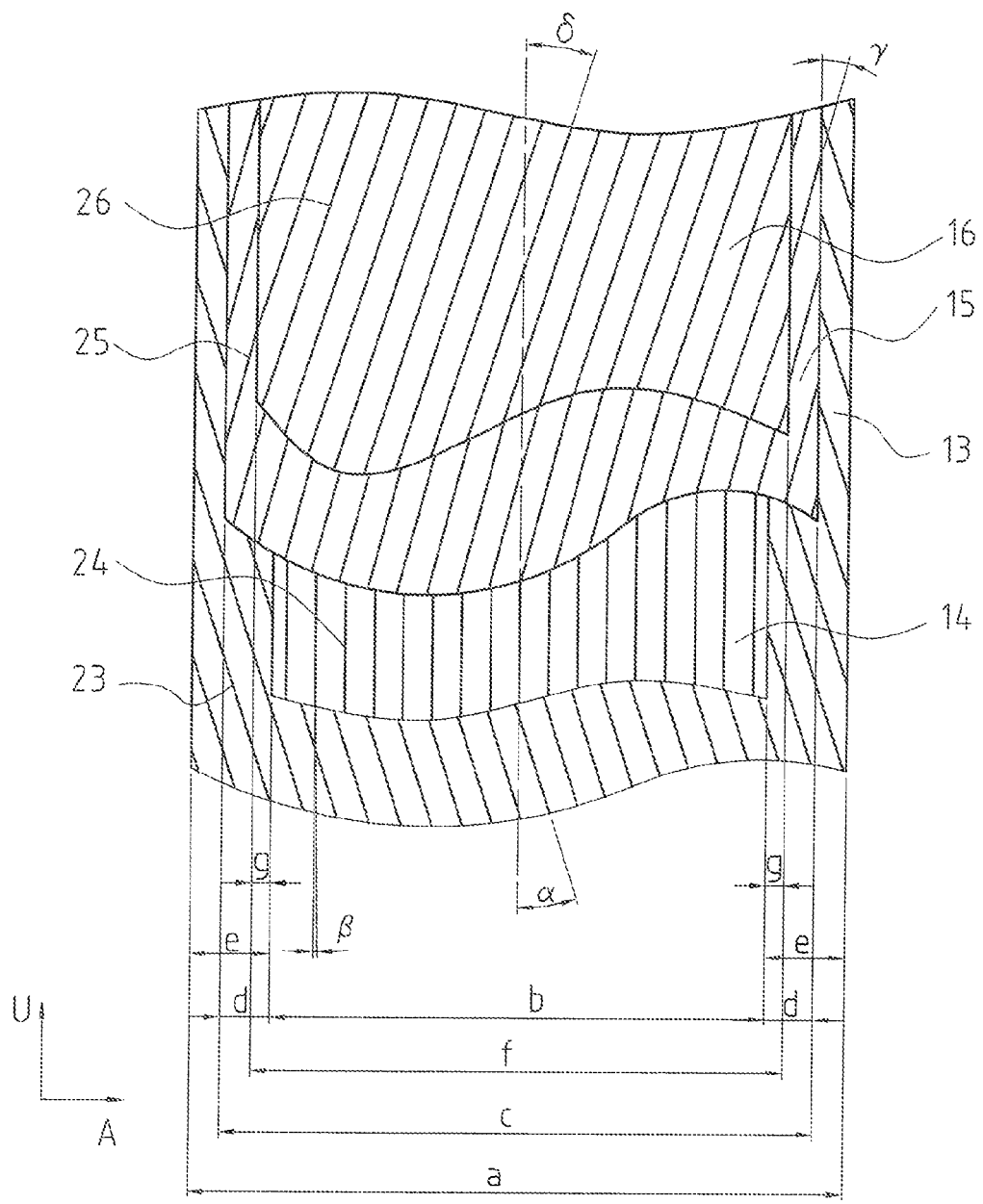
FIG. 4 shows a plan view of the tire belt of FIG. 3 according to section IV-IV from FIG. 3, in which for the sake of simplification all the other components of the tire are not shown.

FIGS. 3 and 4 show a further alternative design in which the tire belt 9 is embodied with an additional tire belt ply 16 in addition to the tire belt plies 13, 14 and 15 (illustrated in FIG. 1 and FIG. 2) on the radial outer side of the outer working ply 15, which additional tire belt ply 16 extends in the circumferential direction U over the entire circumference of the pneumatic vehicle tire and in the axial direction A of the pneumatic vehicle tire from the left hand tire shoulder to the right hand tire shoulder. The tire belt ply 16 is formed from a ply of thread shaped parallel reinforcement members 26 which are embedded in rubber and which extend substantially linearly over the entire axial width (f) of the tire belt ply 16 and enclose an angle $\delta$ of inclination with the circumferential direction U where $15°\leq\delta\leq45°$. Over its entire axial extent, the tire belt ply 16 extends in direct contact with the working ply 15 and ends in the axial direction A at its two tire belt ply edges in each case in an axial position between the nearest tire belt ply edge of the 0° ply 14 and the nearest tire belt ply edge of the radially outer working ply 15 at an axial distance (g) from the tire belt ply edge of the 0° ply 14 where g<d. The width (f) is the dimension of the axial extent of the additional tire belt ply 16 where b<f<c<a.

The reinforcement members 26 of the tire belt ply 16 are embodied in one exemplary embodiment with an identical direction of inclination to that of the reinforcement members 25 of the working ply 15.

The reinforcement members 26 are steel cords.

In another embodiment, the additional tire belt ply 16 is embodied as a 0° ply. The angle $\delta$ of inclination of its reinforcement members 26, which extend over the entire circumference of the pneumatic vehicle tire, is in the range $0°\leq\delta\leq5°$. When the additional working ply 16 is embodied as a 0° ply, the reinforcement members 26 are steel cords of a known type in one design. In another design, the reinforcement members 26 of the working ply 16 which is embodied as a 0° ply are steel cords which are embodied as high elongation cord (HE cord). Such highly extendible high elongation cords have a modulus of elasticity given an extension between 0% and 2% which is less than their modulus of elasticity given an extension by more than 2%.

Figure 5:
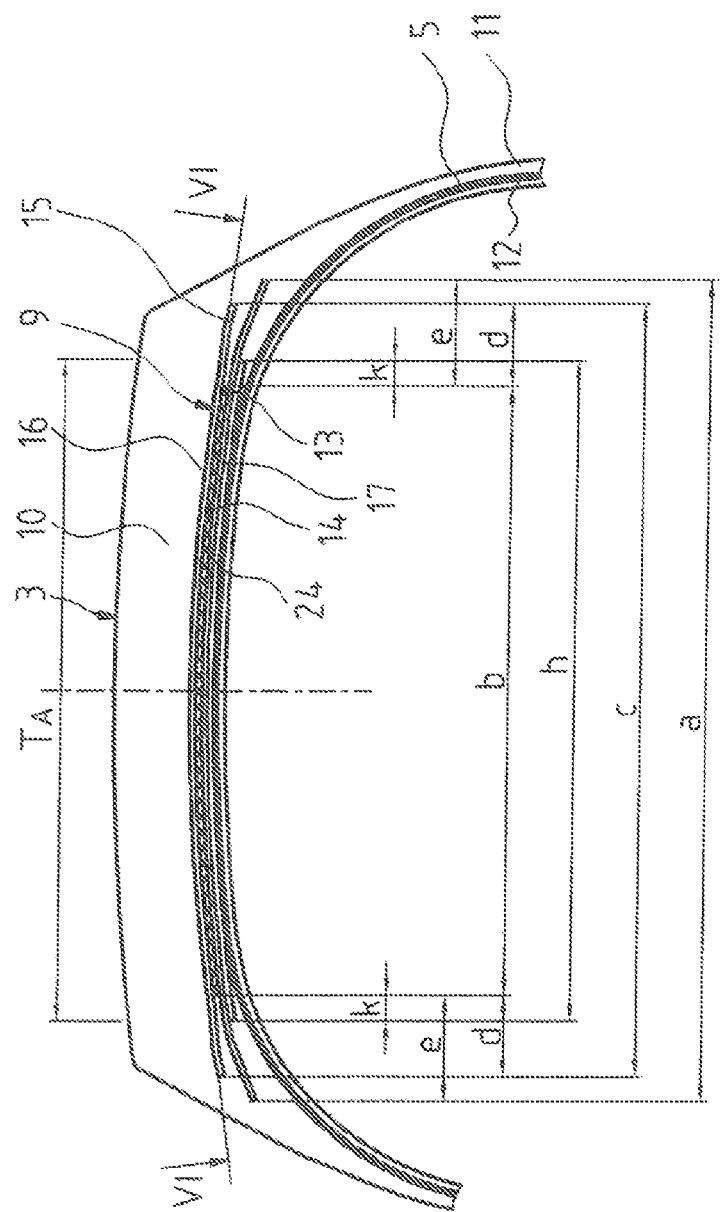
FIG. 5 shows a partial cross sectional view of a pneumatic vehicle tire similar to the view in FIG. 1 with a further alternative embodiment of the tire belt; and, FIG. 6 shows a plan view of the tire belt of FIG. 5 according to section VI-VI from FIG. 5, in which for the sake of simplification all the other components of the tire are not shown.
Figure 6:
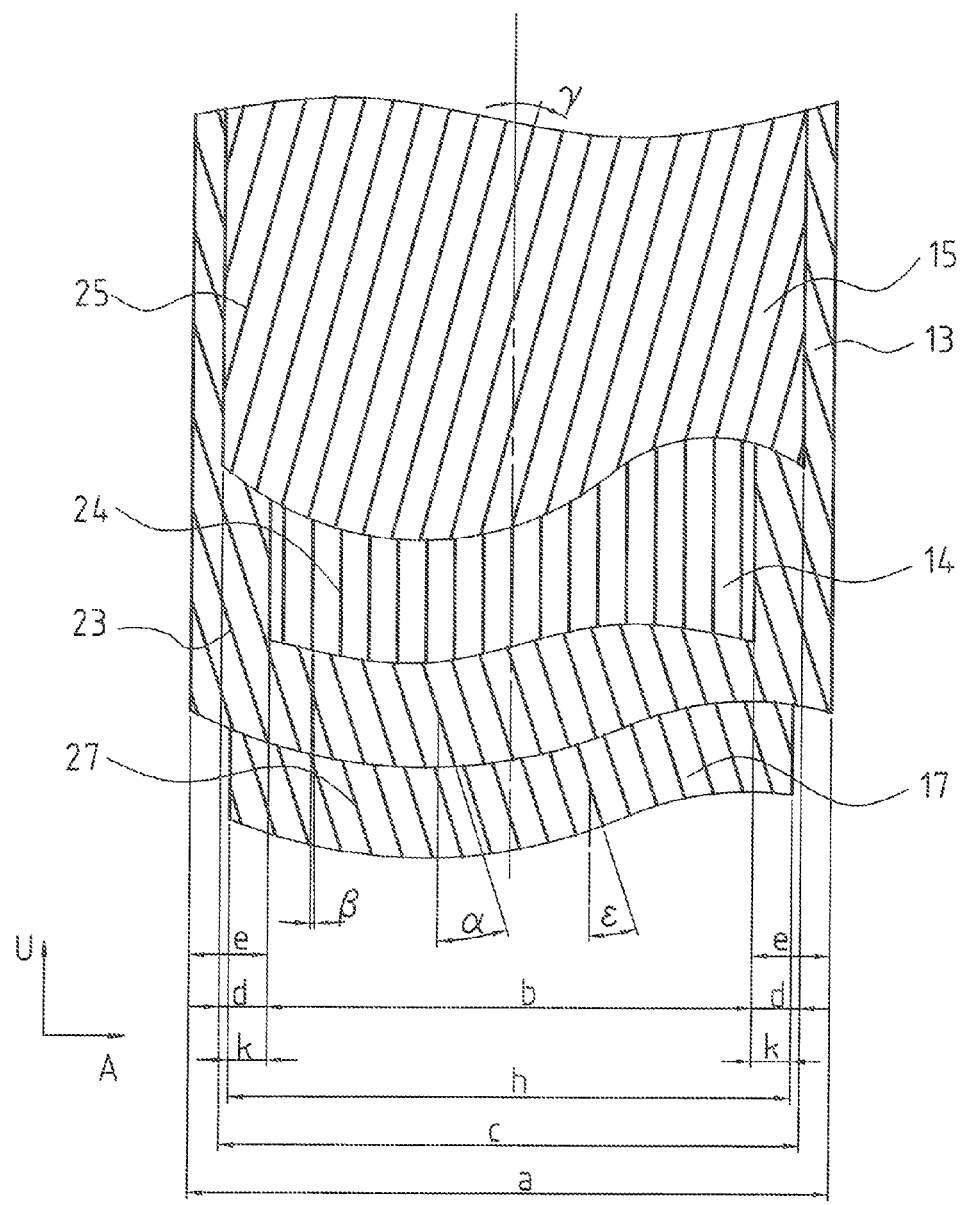

FIGS. 5 and 6 show a further alternative exemplary embodiment in which, in contrast to the exemplary embodiments which are shown in FIG. 1 and FIG. 2 and described in reference thereto, the tire belt 9 is additionally embodied with a tire belt ply 17 which is arranged in a radial position between the radially inner working ply 13 and the carcass 5 and which extends in the circumferential direction U over the entire circumference of the pneumatic vehicle tire and in the axial direction A of the pneumatic vehicle tire from the left hand tire shoulder to the right hand tire shoulder. The tire belt ply 17 is formed from a ply of thread shaped parallel reinforcement members 27 which are embedded in rubber and which extend substantially linearly over the entire axial width (h) of the tire belt ply 17 and enclose an angle $\epsilon$ of inclination with the circumferential direction U where $45°\leq\epsilon\leq90°$, for example where $\epsilon=50°$. The tire belt ply 17 extends over its entire axial extent in direct contact with the working ply 13 and ends in the axial direction A at its two tire belt ply edges, in each case in an axial position between the nearest tire belt ply edge of the 0° ply 14 and the nearest tire belt ply edge of the radially outer working ply 15 at an axial distance (k) from the tire belt ply edge of the 0° ply 14 where k<d<e. The width (h) is the dimension of the axial extent of the additional tire belt ply 17 where b<h<c<a.

In one exemplary embodiment, the reinforcement members 27 of the tire belt ply 17 are embodied with the same direction of inclination as the reinforcement members 23 of the radially inner working ply 13.

The reinforcement members 27 are steel cords.

In further alternative designs, the additional inner tire belt ply 17 (shown in conjunction with FIG. 5 and FIG. 6) is also formed in the case of the designs with an additional tire belt ply 16 illustrated in conjunction with FIG. 3 and FIG. 4. In this case, the tire belt 9 is formed from a 5 ply assembly with the tire belt plies 17, 13, 14, 15 and 16 which are arranged one above the other from radially on the inside to radially on the outside.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 Bead region
2 Side wall
3 Crown region
4 Bead core
5 Carcass
6 Apex
7 Carcass turned over portion
8 Bead reinforcing strip
9 Tire belt
10 Profiled tread
11 Side wall rubber strip
12 Inner ply
13 Tire belt ply (working ply)
14 Tire belt ply (zero degree ply)
15 Tire belt ply (working ply)
16 Tire belt ply
17 Tire belt ply
23 Reinforcement member
24 Reinforcement member
25 Reinforcement member
26 Reinforcement member
27 Reinforcement member

What is claimed is:

1. A pneumatic vehicle tire for utility vehicles, the pneumatic vehicle tire defining a circumferential direction (U) and comprising:
   a carcass;
   a plurality of belt plies arranged resting one on top of the other radially inward to radially outward and said plurality of belt plies conjointly defining a tire belt configured radially outside said carcass;
   a profiled tread constructed radially outside said belt and built up on said belt;
   at least two of said belt plies being configured as working plies including a radially inner working ply having a plurality of parallel first reinforcement members made of steel embedded in rubber and a radially outer working ply having a plurality of parallel second reinforcement members made of steel embedded in rubber;
   said first reinforcement members of said inner working ply having an orientation which, together with the circumferential direction (U), encloses an angle α lying in a range of 10°≤α≤24°;
   said second reinforcement members of said outer working ply having an orientation which, together with the circumferential direction (U), encloses an angle γ lying in a range of 10°≤γ24°;
   said first reinforcement members having, in relation to the circumferential direction (U), an axial inclination which is opposite the axial inclination of said second reinforcement members to the circumferential direction (U);
   said first reinforcement members having a breaking force F1;
   said second reinforcement members having a breaking force F2;
   said first reinforcement members being configured to be substantially nonextendible with an extendability of D1<0.2% at 10% of said breaking force F1 and said second reinforcement members being configured to be extendible with an extendability of D2≥0.2% at 10% of said breaking force F2;
   one of said belt plies being a third belt ply configured as a zero degree ply and being arranged between said inner working ply and said outer working ply; and,
   said third belt ply having a plurality of third parallel reinforcement members having an orientation which together with the circumferential direction (U), encloses an angle β lying in a range of 0°≤β≤5°,
   wherein said zero degree ply is in direct contact with said inner working ply and is in direct contact with said outer working ply,
   wherein said first working ply is arranged in a radially inner position relative to said second working ply,
   wherein said zero degree ply is arranged between a first axial end and a second axial end of said inner working ply,
   wherein said inner working ply has an axial extension (a),
   wherein said outer working ply has an axial extension (c),
   wherein said axial extension (c) is configured to be less than said axial extension (a),
   wherein said first axial end and said second axial end of said outer working ply are within said axial extension (a) of said inner working ply,
   wherein said third belt ply, which is arranged between said inner working ply and said outer working ply, has an axial extension (b) in the pneumatic vehicle tire which is less than said axial extension (a) and said axial extension (c), and
   wherein said axial extension (b) ends within each of said extension (a) of said inner working ply and said extension (c) of said outer working ply.

2. The pneumatic vehicle tire of claim 1, wherein said second reinforcement members each have a breaking force F2>2500N.

3. The pneumatic vehicle tire of claim 2, wherein said first reinforcement members each have a breaking force F1≤2500N.

4. The pneumatic vehicle tire of claim 1, wherein said first reinforcement members each have a breaking force F1≤2500N.

5. The pneumatic vehicle tire of claim 1, wherein said second reinforcement members of said second working ply each have an extendability D2 lying in a range of 0.2% ≤D2≤0.35% at 10% of said breaking force F2.

6. The pneumatic vehicle tire of claim 1, wherein said axial extension (b) is at least 10 mm.

7. The pneumatic vehicle tire of claim 1, wherein said third reinforcement members of said zero degree ply are made of steel.

8. The pneumatic vehicle tire of claim 1, wherein at least said third reinforcement members of said third belt ply are high elongation cords (HE).

9. A pneumatic vehicle tire for utility vehicles, the pneumatic vehicle tire defining a circumferential direction (U) and comprising:
   a carcass;
   a plurality of belt plies arranged resting one on top of the other radially inward to radially outward and said plurality of belt plies conjointly defining a tire belt configured radially outside said carcass;
   a profiled tread constructed radially outside said belt and built up on said belt;
   at least two of said belt plies being configured as working plies including a radially inner working ply having a plurality of parallel first reinforcement members made of steel embedded in rubber and a radially outer working ply having a plurality of parallel second reinforcement members made of steel embedded in rubber;
   said first reinforcement members of said inner working ply having an orientation which, together with the circumferential direction (U), encloses an angle α lying in a range of 10°≤α≤24°;
   said second reinforcement members of said outer working ply having an orientation which, together with the circumferential direction (U), encloses an angle γ lying in a range of 10°≤γ≤24°;
   said first reinforcement members having, in relation to the circumferential direction (U), an axial inclination which is opposite the axial inclination of said second reinforcement members to the circumferential direction (U);
   said first reinforcement members having a breaking force F1;
   said second reinforcement members having a breaking force F2;
   said first reinforcement members being configured to be substantially nonextendible with an extendability of D1<0.2% at 10% of said breaking force F1 and said second reinforcement members being configured to be extendible with an extendability of D2≤0.2% at 10% of said breaking force F2;
   one of said belt plies being a third belt ply configured as a zero degree ply and being arranged between said inner working ply and said outer working ply;

said third belt ply having a plurality of third parallel reinforcement members having an orientation which together with the circumferential direction (U), encloses an angle β lying in a range of 0°≤β≤5°; and, a further belt ply arranged radially outside said radially outer working ply and having a plurality of parallel fourth reinforcement members embedded in rubber, wherein said first working ply is arranged in a radially inner position relative to said second working ply, wherein said inner working ply has an axial extension (a), wherein said outer working ply has an axial extension (c), wherein said axial extension (c) is configured to be less than said axial extension (a), and wherein said outer working ply has a first and a second axial end both of which are within said axial extension (a) of said inner working ply.

10. The pneumatic vehicle tire of claim 9, wherein said fourth reinforcement members of said further belt ply have an orientation which, together with the circumferential direction (U), encloses an angle δ lying in the range of 10°≤δ≤90°.

11. The pneumatic vehicle tire of claim 9, wherein said fourth reinforcement members of said further belt ply have an orientation which, together with the circumferential direction (U), encloses an angle δ lying in a range of 15°≤δ≤45°.

12. A pneumatic vehicle tire for utility vehicles, the pneumatic vehicle tire defining a circumferential direction (U) and comprising:

a carcass;

a plurality of belt plies arranged resting one on top of the other radially inward to radially outward and said plurality of belt plies conjointly defining a tire belt configured radially outside said carcass;

a profiled tread constructed radially outside said belt and built up on said belt;

at least two of said belt plies being configured as working plies including a radially inner working ply having a plurality of parallel first reinforcement members made of steel embedded in rubber and a radially outer working ply having a plurality of parallel second reinforcement members made of steel embedded in rubber;

said first reinforcement members of said inner working ply having an orientation which, together with the circumferential direction (U), encloses an angle α lying in a range of 10°≤α≤24°;

said second reinforcement members of said outer working ply having an orientation which, together with the circumferential direction (U), encloses an angle γ lying in a range of 10°≤γ≤24°;

said first reinforcement members having, in relation to the circumferential direction (U), an axial inclination which is opposite the axial inclination of said second reinforcement members to the circumferential direction (U);

said first reinforcement members having a breaking force F1;

said second reinforcement members having a breaking force F2;

said first reinforcement members being configured to be substantially nonextendible with an extendability of D1<0.2% at 10% of said breaking force F1 and said second reinforcement members being configured to be extendible with an extendability of D2≥0.2% at 10% of said breaking force F2;

one of said belt plies being a third belt ply configured as a zero degree ply and being arranged between said inner working ply and said outer working ply;

said third belt ply having a plurality of third parallel reinforcement members having an orientation which together with the circumferential direction (U), encloses an angle β lying in a range of 0°≤β≤5°; and, a further belt ply arranged radially outside said radially outer working ply and having a plurality of parallel fourth reinforcement members embedded in rubber, wherein said first working ply is arranged in a radially inner position relative to said second working ply, and wherein said further belt ply is configured as a zero degree ply and said fourth reinforcement members have an orientation which, together with the circumferential direction (U), encloses an angle δ lying in a range of 0°≤δ≤5°.

13. A pneumatic vehicle tire for utility vehicles, the pneumatic vehicle tire defining a circumferential direction (U) and comprising:

a carcass;

a plurality of belt plies arranged resting one on top of the other radially inward to radially outward and said plurality of belt plies conjointly defining a tire belt configured radially outside said carcass;

a profiled tread constructed radially outside said belt and built up on said belt;

at least two of said belt plies being configured as working plies including a radially inner working ply having a plurality of parallel first reinforcement members made of steel embedded in rubber and a radially outer working ply having a plurality of parallel second reinforcement members made of steel embedded in rubber;

said first reinforcement members of said inner working ply having an orientation which, together with the circumferential direction (U), encloses an angle α lying in a range of 10°≤α≤24°;

said second reinforcement members of said outer working ply having an orientation which, together with the circumferential direction (U), encloses an angle γ lying in a range of 10°≤γ≤24°;

said first reinforcement members having, in relation to the circumferential direction (U), an axial inclination which is opposite the axial inclination of said second reinforcement members to the circumferential direction (U);

said first reinforcement members having a breaking force F1;

said second reinforcement members having a breaking force F2;

said first reinforcement members being configured to be substantially nonextendible with an extendability of D1<0.2% at 10% of said breaking force F1 and said second reinforcement members being configured to be extendible with an extendability of D2≥0.2% at 10% of said breaking force F2;

one of said belt plies being a third belt ply configured as a zero degree ply and being arranged between said inner working ply and said outer working ply; and, said third belt ply having a plurality of third parallel reinforcement members having an orientation which together with the circumferential direction (U), encloses an angle β lying in a range of 0°≤β≤5°, wherein said zero degree ply is in direct contact with said inner working ply and is in direct contact with said outer working ply, wherein said first working ply is arranged in a radially inner position relative to said second working ply, wherein said zero degree ply is arranged between a first axial end and a second axial end of said inner working ply, wherein said inner working ply has an axial extension (a), wherein said outer working ply has an axial extension (c), wherein said axial extension (c) is configured to be less than said axial extension (a), wherein said first axial end and said second axial end of said outer working ply are within said axial extension (a) of said inner working ply;

wherein one of said belt plies is a fourth belt ply having fourth parallel reinforcement members embedded in rubber arranged radially within said radial inner working ply and between said radial inner working ply and said carcass;

wherein said fourth reinforcement members have an orientation which, together with the circumferential direction (U), encloses an angle $\epsilon$; and, wherein said angle $\epsilon$ lies in a range of $45° \leq \epsilon \leq 90°$.

* * * * *